United States Patent
Fujiwara

(10) Patent No.: US 8,251,169 B2
(45) Date of Patent: Aug. 28, 2012

(54) TEMPERATURE ADJUSTMENT STRUCTURE FOR POWER STORAGE APPARATUS

(75) Inventor: Nobuyoshi Fujiwara, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 12/808,250

(22) PCT Filed: Nov. 6, 2009

(86) PCT No.: PCT/JP2009/005892
§ 371 (c)(1),
(2), (4) Date: Jun. 15, 2010

(87) PCT Pub. No.: WO2010/073464
PCT Pub. Date: Jul. 1, 2010

(65) Prior Publication Data
US 2011/0240251 A1    Oct. 6, 2011

(30) Foreign Application Priority Data

Dec. 24, 2008 (JP) .................................. 2008-328847

(51) Int. Cl.
*B60K 11/00* (2006.01)
(52) U.S. Cl. ...................... 180/68.1; 180/68.2; 180/68.5
(58) Field of Classification Search .................. 180/68.1, 180/68.2, 68.5
See application file for complete search history.

(56) References Cited

U.S. PATENT DOCUMENTS

| 5,392,873 | A  | * | 2/1995  | Masuyama et al. | 180/68.5 |
| 5,490,572 | A  | * | 2/1996  | Tajiri et al.   | 180/65.1 |
| 5,613,569 | A  | * | 3/1997  | Sugioka et al.  | 180/68.5 |
| 7,635,040 | B2 | * | 12/2009 | Seo et al.      | 180/68.1 |
| 7,642,002 | B2 | * | 1/2010  | Hamery et al.   | 429/120  |
| 7,654,351 | B2 | * | 2/2010  | Koike et al.    | 180/68.5 |
| 7,819,215 | B2 | * | 10/2010 | Tsuchiya        | 180/68.5 |
| 8,016,063 | B2 | * | 9/2011  | Tsuchiya        | 180/68.5 |
| 2008/0047767 | A1 | * | 2/2008 | Tsuchiya     | 180/68.5 |
| 2009/0120702 | A1 | * | 5/2009 | Yoda         | 180/68.1 |
| 2010/0294580 | A1 | * | 11/2010 | Kubota et al. | 180/68.1 |

FOREIGN PATENT DOCUMENTS

| JP | 2002-219949 | 8/2002 |
| JP | 2005-205953 | 8/2005 |
| JP | 2008-277060 | 11/2008 |

* cited by examiner

*Primary Examiner* — Jeffrey J Restifo
*Assistant Examiner* — Erez Gurari
(74) *Attorney, Agent, or Firm* — Finnegan, Henderson, Farabow, Garrett & Dunner, LLP

(57) ABSTRACT

A temperature adjustment structure for adjusting a temperature of a power storage module included in a power storage apparatus mounted on a vehicle has a duct forming a moving path of air in adjusting the temperature of the power storage module. The duct has a protrusion portion protruding toward the outside of the duct with respect to a surface forming the moving path. The protrusion portion is located above a connector that is provided additionally for the power storage apparatus and used for electrical connection to equipment (peripheral equipment) placed parallel with the power storage module within the power storage apparatus. At least a connection portion of the connector is located within an area of the protrusion portion when viewed from a vertical direction.

4 Claims, 7 Drawing Sheets

TEMPERATURE ADJUSTMENT STRUCTURE FOR POWER STORAGE APPARATUS

CROSS-REFERENCE TO RELATED APPLICATIONS

This application is a national phase application of International Application No. PCT/JP2009/005892, filed Nov. 6, 2009, and claims the priority of Japanese Application No. 2008-328847, filed Dec. 24, 2008, the contents of both of which are incorporated herein by reference.

TECHNICAL FIELD

The present invention relates to a temperature adjustment structure for adjusting the temperature of a power storage apparatus (power storage module) mounted on a vehicle.

BACKGROUND ART

In some conventional structures, air within the interior of a vehicle is directed to a battery pack to suppress a rise in temperature of the battery pack. In the structure of this type, an intake port for taking in air is provided within the vehicle's interior, and air taken in from the intake port is directed to the battery pack through an intake duct. The air reaching the battery pack is then discharged to the outside of the vehicle through an exhaust duct.

On the other hand, equipment (for example, a controller or a relay) for use in control and the like of the battery pack is placed in an area adjacent to the battery pack and is covered with a case in some examples. An upper face of the case is integrally formed with the exhaust duct in some instances (see, for example, Patent Document 1).

[Patent Document 1] Japanese Patent Laid-Open No. 2002-219949 (FIG. 2)

[Patent Document 2] Japanese Patent Laid-Open No. 2005-205953

DESCRIPTION OF THE INVENTION

Problems to be Solved by the Invention

In the structure in which the equipment is covered with the case, the case can prevent a liquid from falling on the equipment. Wiring needs to be extended to the outside of the case in order to connect electrically the equipment within the case to external equipment. In some structures, wiring is divided into segments and these wiring segments are connected to each other through a connector for the reason that the battery pack can be easily installed or the like.

In the structure using the connector, the connector is located outside the case, so that it is necessary to prevent a liquid from reaching a connecting portion of the connector.

To address this, it is an object of the present invention to provide a structure in which a temperature adjustment structure for adjusting the temperature of a power storage module is used to allow the prevention of the fall of a liquid toward a connector.

Means for Solving the Problems

According to the present invention, a temperature adjustment structure for adjusting a temperature of a power storage module included in a power storage apparatus mounted on a vehicle, comprises a duct forming a moving path of air in adjusting the temperature of the power storage module. The duct has a protrusion portion protruding toward the outside of the duct with respect to a surface forming the moving path. The protrusion portion is located above a connector that is provided additionally for the power storage apparatus and used for electrical connection to equipment (peripheral equipment) placed parallel with the power storage module within the power storage apparatus. In addition, at least a connection portion of the connector is located within an area of the protrusion portion when viewed from a vertical direction, The protrusion portion is formed independently of a portion forming the moving path in the duct. Examples of the duct forming the moving path of the air include an intake duct for supplying air for use in temperature adjustment to the power storage module and an exhaust duct for discharging air used in temperature adjustment to the outside of the power storage module. One duct of the intake duct and the exhaust duct can be placed above the peripheral equipment and the other duct can be placed below the peripheral equipment. In this structure, the abovementioned protrusion portion can be provided for the one duct. Air within the vehicle's interior can be used as the air for use in temperature adjustment. The vehicle's interior refers to space in which a passenger is.

The peripheral equipment is equipment used in association with the power storage module, and an example thereof is equipment which operates on a low voltage system (for example, 12[V]) lower than the output voltage from the power storage apparatus (power storage module). More specifically, examples of the equipment include equipment used for controlling charge and discharge of the power storage module and a fan for taking in air into the duct. The peripheral equipment can be placed adjacently to the power storage module or can be placed with space from the power storage module.

On the other hand, a panel for defining space as a luggage compartment of the vehicle can be placed above the power storage apparatus. For example when a liquid is spilt on the panel which has a depression portion in its outer edge portion for fixing the panel, the liquid tends to stay in the depression portion. Thus, the abovementioned protrusion portion can be located between the depression portion and the connector to prevent the liquid dropped out of the depression portion from directly reaching the connector.

Effect of the Invention

According to the present invention, the protrusion portion provided for the duct of the temperature adjustment structure can prevent a liquid from falling toward the connection portion of the connector to maintain the electrical connection of the connector. In addition, since the protrusion portion is only required to be formed on the outer face of the duct, the simple structure can be achieved.

EMBODIMENT OF THE INVENTION

An embodiment of the present invention will hereinafter be described.

[Embodiment 1]

Figure 1:
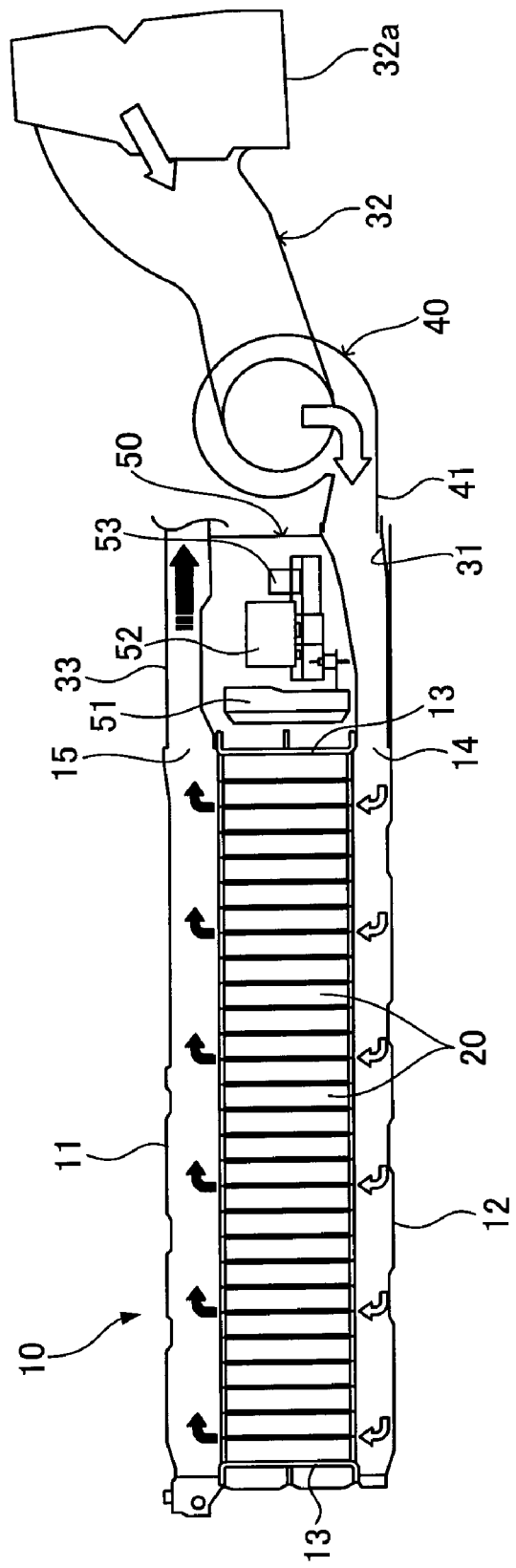
FIG. 1 A schematic diagram showing a temperature adjustment structure which is Embodiment 1 of the present invention.
Figure 2:
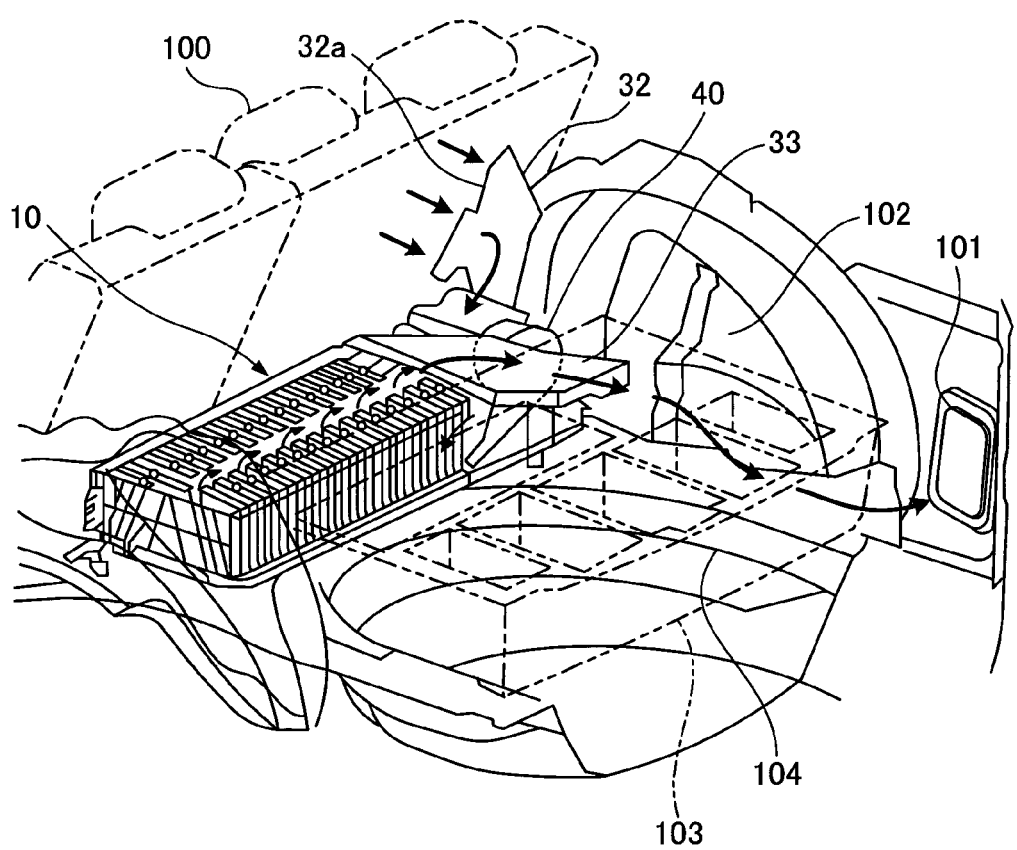
FIG. 2 A schematic diagram showing the temperature adjustment structure in Embodiment 1 mounted on a vehicle.

A temperature adjustment structure which is Embodiment 1 of the present invention will be described with reference to FIG. 1 and FIG. 2. FIG. 1 is a schematic diagram showing a structure for adjusting the temperature of a battery pack, and FIG. 2 is a schematic diagram showing the temperature adjustment structure mounted on a vehicle. A battery pack (power storage apparatus) 10 of the present embodiment is mounted on the vehicle and is used as a power source of the vehicle. Examples of the vehicle include a hybrid vehicle and an electric vehicle.

The hybrid vehicle is a vehicle which has not only the battery pack 10 but also another power source such as an internal combustion engine or a fuel battery which outputs energy for use in running of the vehicle. The electric vehicle is a vehicle which runs only with the output from the battery pack 10. The battery pack 10 is discharged to output energy for use in running of the vehicle or is charged with kinetic energy produced in braking of the vehicle as regenerative power. The battery pack 10 can be charged with power supplied from the outside of the vehicle.

As shown in FIG. 2, the battery pack 10 is placed at the rear of a rear seat 100 placed in the vehicle's interior. Space formed above the battery pack 10 is used as a luggage room. The position where the battery pack 10 is placed is not limited to the position shown in FIG. 2 but is set as appropriate depending on the layout in the vehicle's interior.

The battery pack 10 has an upper case 11 and a lower case 12 which form space for accommodating a plurality of battery modules (power storage modules) 20. The upper case 11 has surfaces opposite to upper faces and side faces of the battery modules 20. Space is formed between the upper faces of the battery modules 20 and an upper face of the upper case 11, and this space is used as a path (exhaust path) for discharging air from the battery modules 20, as later described.

The upper case 11 and the plurality of battery modules 20 are fixed to the lower case 12. An area of part of the lower case 12 is separate from bottom faces of the battery modules 20 and this space is used as a path (intake path) for supplying air to the battery modules 20, as later described.

The plurality of battery modules 20 are placed side by side along one direction (left to right direction in FIG. 1) and are electrically connected in series to each other through a bus bar (not shown). A general negative cable and a general positive cable for use in charge and discharge of the battery modules 20 are connected to particular ones of the plurality of battery modules 20. These cables are connected to equipment such as a DC/DC converter or an inverter.

The plurality of battery modules 20 are sandwiched between a pair of end plates 13 at both ends in the arrangement direction. Space for passing air is formed between adjacent two of the battery modules 20, as later described. A restraint rod (not shown) extending in the arrangement direction of the battery modules 20 is connected to each of the pair of endplates 13 and supplies a restraint force to the plurality of battery modules 20 through the end plates 13. Alternatively, it is possible to use a structure in which the restraint rod and the end plates 13 are omitted and no restraint force is supplied to the plurality of battery modules 20.

The battery module 20 has a plurality of cells (not shown) which are electrically connected in series to each other. The plurality of cells are placed side by side in a direction orthogonal to the arrangement direction of the battery modules 20, that is, in a direction orthogonal to the sheet of FIG. 1. A secondary battery such as a nickel metal hydride battery or a lithium-ion battery can be used as the cell. Instead of the secondary battery, an electric double layer capacitor can be used. The number of the cells constituting the battery module 20 or the number of the battery modules 20 can be set as appropriate. While the battery modules 20 formed of the plurality of cells are aligned in one direction in the present embodiment, the present invention is not limited thereto, and it is possible to use a structure in which the cells are aligned in one direction.

One end of a first intake duct 31 forming part of the intake path is connected to an opening portion 14 provided in a lower portion of the battery pack 10. A duct portion 41 of a fan 40 is connected to the other end of the first intake duct 31.

The lower case 12 of the battery pack 10 is located below the first intake duct 31. Specifically, in the present embodiment, the lower case 12 extends to the space located below the first intake duct 31 such that the first intake duct 31 and the fan 40 are fixed to the lower case 12. Such a configuration allows the battery modules 20, the first intake duct 31 and the like to be handled as a single unit and mounted easily on the vehicle.

One end of a second intake duct 32 forming part of the intake path is connected to the fan 40, and an intake port 32a for taking in air within the vehicle's interior is provided at the other end of the second intake duct 32. The intake port 32a faces the vehicle's interior and is placed at a position adjacent to the seat back of the rear seat 100 and near a seat cushion (see FIG. 2). The vehicle's interior refers to space in which a passenger is. While the intake port 32a is provided at the abovementioned position in the present embodiment, the present invention is not limited thereto, and the position can be set as appropriate.

One end of an exhaust duct 33 is connected to an opening portion 15 provided in an upper portion of the battery pack 10. The exhaust duct 33 is provided for discharging the air from the battery modules 20 to the outside of the vehicle. In the present embodiment, as shown in FIG. 2, the other end of the exhaust duct 33 is placed in the vehicle's interior such that the air directed into the exhaust duct 33 is discharged to the vehicle's interior.

As shown in FIG. 2, the air discharged from the exhaust duct 33 moves through the vehicle's interior and reaches a ventilation duct 101. The air is discharged to the outside of the vehicle through the ventilation duct 101. The exhaust path of the air from the exhaust duct 33 to the ventilation duct 101 is composed of a wheel house 102, a luggage box 103, and a rear floor 104. The luggage box 103 is located in the horizontal plane substantially the same as the battery pack 10 and is formed adjacently to the battery pack 10 in a rearward direction of the vehicle.

Since such a configuration of the exhaust path eliminates the need to extend the exhaust duct 33 to the ventilation duct 101, the exhaust duct 33 can be reduced in length. This can result in a reduction in cost of the temperature adjustment structure. While the exhaust path is composed by using the wheel house 102, the luggage box 103, and the rear floor 104 in the present embodiment, the present invention is not limited thereto. Specifically, the exhaust path can be composed by using a vehicle body and an interior part.

The battery pack 10 has a case 50 in the space formed between the first intake duct 31 and the exhaust duct 33. The case 50 is placed at a position adjacent to the battery modules 20 in the arrangement direction of the battery modules 20, and equipment for controlling charge and discharge of the battery modules 20 is placed within the case 50. Examples of the equipment include a controller 51 for determining the state of the battery modules 20, a relay 52 for allowing or inhibiting input and output to and from the battery modules 20, and an electric current sensor 53 for detecting an electric current in the battery modules 20.

Next, the temperature adjustment of the battery modules 20 in the abovementioned temperature adjustment structure will be described. Arrows shown in FIG. 1 and FIG. 2 represent the moving directions of air when the temperature of the battery modules 20 is adjusted. White arrows shown in FIG. 1 represent the moving directions of air before contact with the battery modules 20, and black arrows shown in FIG. 1 represent the moving directions of air after contact with the battery modules 20.

When the fan 40 is driven, the air within the vehicle's interior is taken into the second intake duct 32 through the intake port 32a, passed through the fan 40 and the first intake duct 31, and is moved into the battery pack 10. Since part of the lower case 12 is separate from the bottom faces of the battery modules 20 as described above, the air directed from the first intake duct 31 is moved along the lower case 12 and reaches all the battery modules 20. The air moved along the lower case 12 enters the space formed between adjacent ones of the battery modules 20.

The contact of the air with each of the battery modules 20 achieves heat exchange between the air and the battery modules 20. Specifically, when the battery modules 20 generate heat due to charge and discharge and the like, the air can take heat of the battery modules 20 to suppress a rise in temperature of the battery modules 20. When the battery modules 20 are excessively cooled by the ambient temperature, the air can provide heat to the battery modules 20 to suppress a drop in temperature of the battery modules 20. The heat exchange is achieved between the air and the battery modules 20 in this manner to allow the adjustment of the temperature of the battery modules 20.

After the heat exchange with the battery modules 20, the air is moved to the space formed above the battery modules 20, and then is directed toward the opening portion 15 while moving along the upper case 11. The air after the heat exchange is moved through the exhaust path composed of the exhaust duct 33, the wheel house 102 and the like, and then is discharged to the outside of the vehicle through the ventilation duct 101.

While the fan 40 is placed on the intake path in the present embodiment, the present invention is not limited thereto. Specifically, the air within the vehicle's interior is only required to be taken from the intake port 32a, and specifically, the fan 40 can be placed on the exhaust path.

Figure 3:
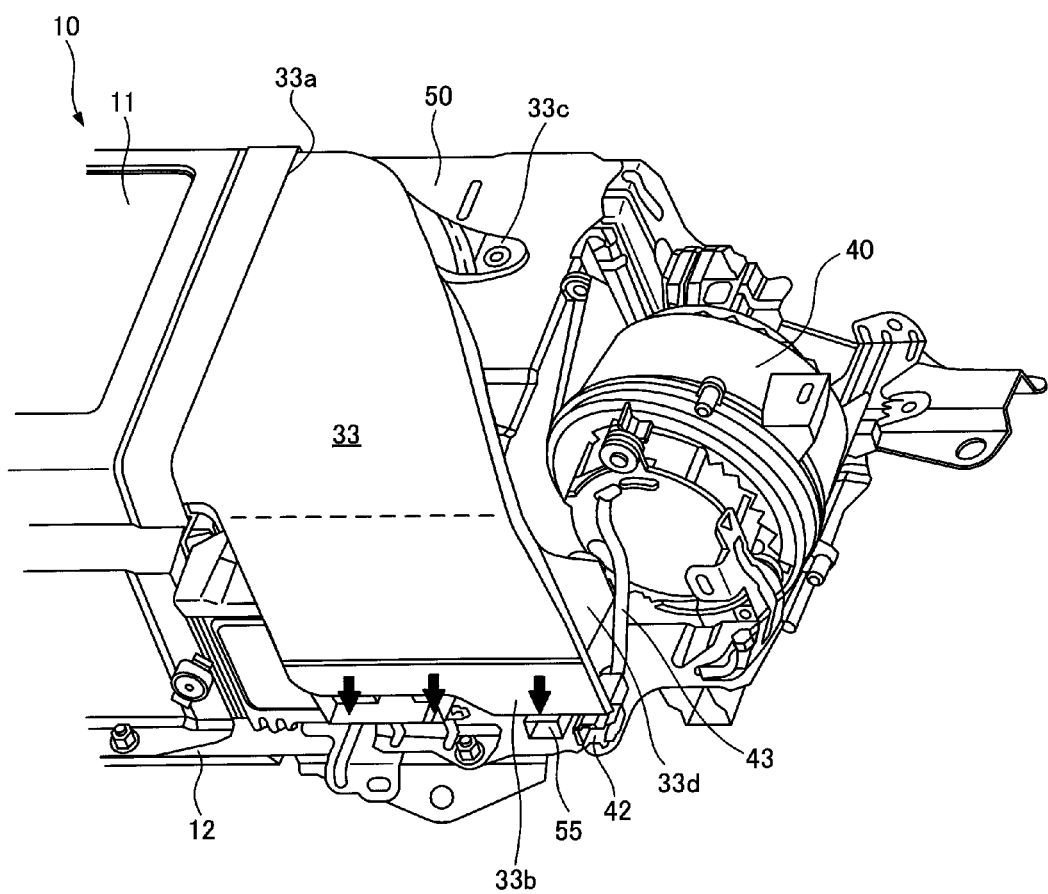
FIG. 3 A perspective view showing the outer appearance of a peripheral structure of an exhaust duct in Embodiment 1.
Figure 4:
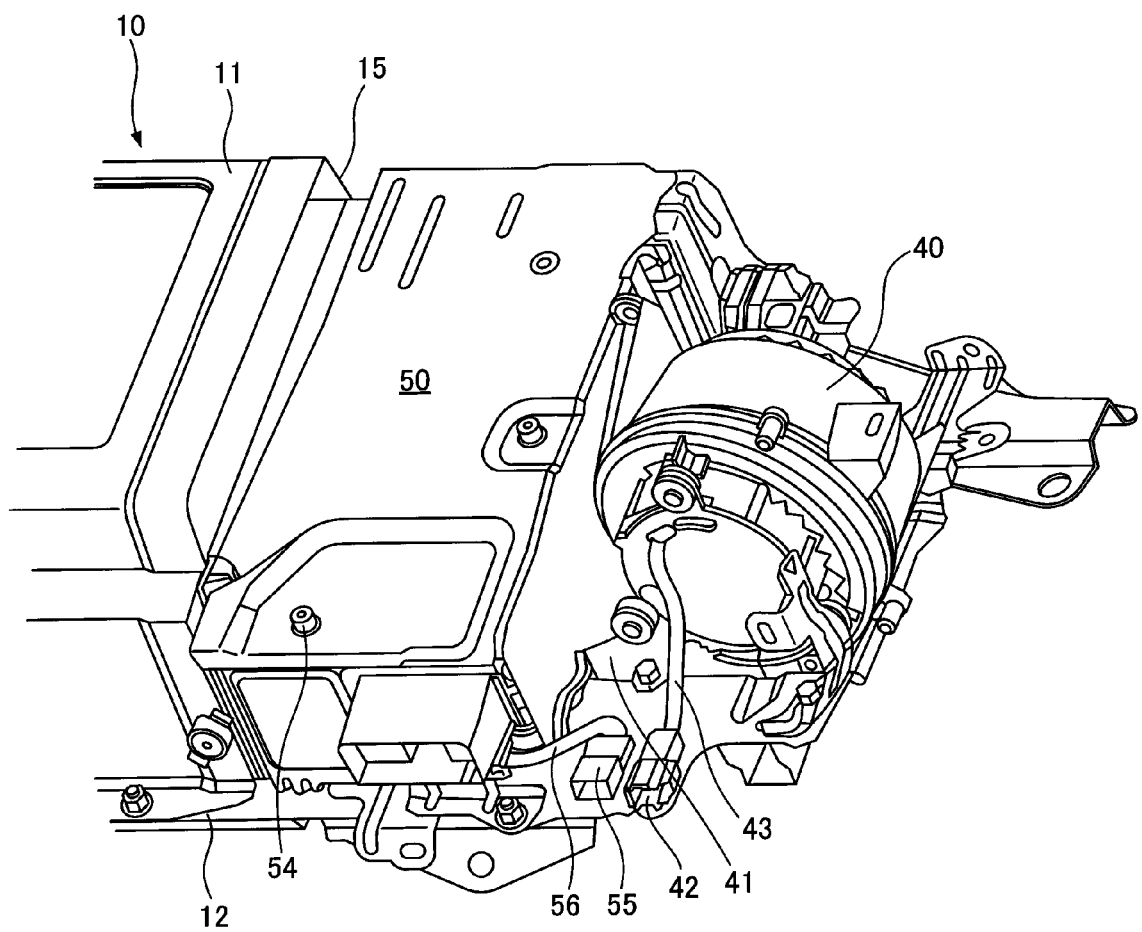
FIG. 4 A diagram of the structure shown in FIG. 3 from which the exhaust duct is omitted.

Next, a peripheral structure of the exhaust duct 33 will be described with reference to FIG. 3 and FIG. 4. FIG. 3 is a perspective view showing the outer appearance of the peripheral structure of the exhaust duct 33. FIG. 4 is a diagram illustrating the structure shown in FIG. 3 from which the exhaust duct 33 is omitted.

A connection port 33a located at one end of the exhaust duct 33 is connected to the opening portion 15 of the battery pack 10. An exhaust port 33b for discharging the air from the battery modules 20 into the vehicle's interior is provided at the other end of the exhaust duct 33. The exhaust port 33b is placed at a position where the air is discharged toward the exhaust path (see FIG. 2) composed of the wheel house 102 and the like as described above.

A foot portion 33c is provided for the exhaust duct 33. The foot portion 33c is fixed to an upper face of the case 50 by a fastening member (not shown). As shown in FIG. 4, a fastening member 54 is placed on the upper face of the case 50, and the fastening member 54 is used to perform the positioning of the exhaust duct 33 in the present embodiment.

Specifically, a depression portion (not shown) having the form along the outer shape of the fastening member 54 is formed in an area of the exhaust duct 33 that is opposed to the fastening member 54. The depression portion is engaged with the fastening member 54 and the connection port 33a of the exhaust duct 33 is connected to the opening portion 15 to enable the positioning of the exhaust duct 33. In other words, displacement of the exhaust duct 33 on the upper face of the case 50 can be prevented. When the foot portion 33c is fastened to the upper face of the case 50 with the fastening member in the state in which the exhaust duct 33 has been positioned, the exhaust duct 33 can be fixed to the case 50.

In the abovementioned structure, the positioning of the exhaust duct 33 can be performed easily to improve the assembly efficiency of the temperature adjustment structure. In addition, the exhaust duct 33 can be fixed readily only by using the fastening member to fasten the foot portion 33c to the upper face of the case 50, in other words, only by fixing one portion of the exhaust duct 33 to the case 50. While the exhaust duct 33 is fixed to the upper face of the case 50 in the present embodiment, the exhaust duct 33 and the upper face of the case 50 can be integrally formed. In that event, the upper face of the case formed integrally with the exhaust duct is fixed to a side face of the case.

Figure 5:
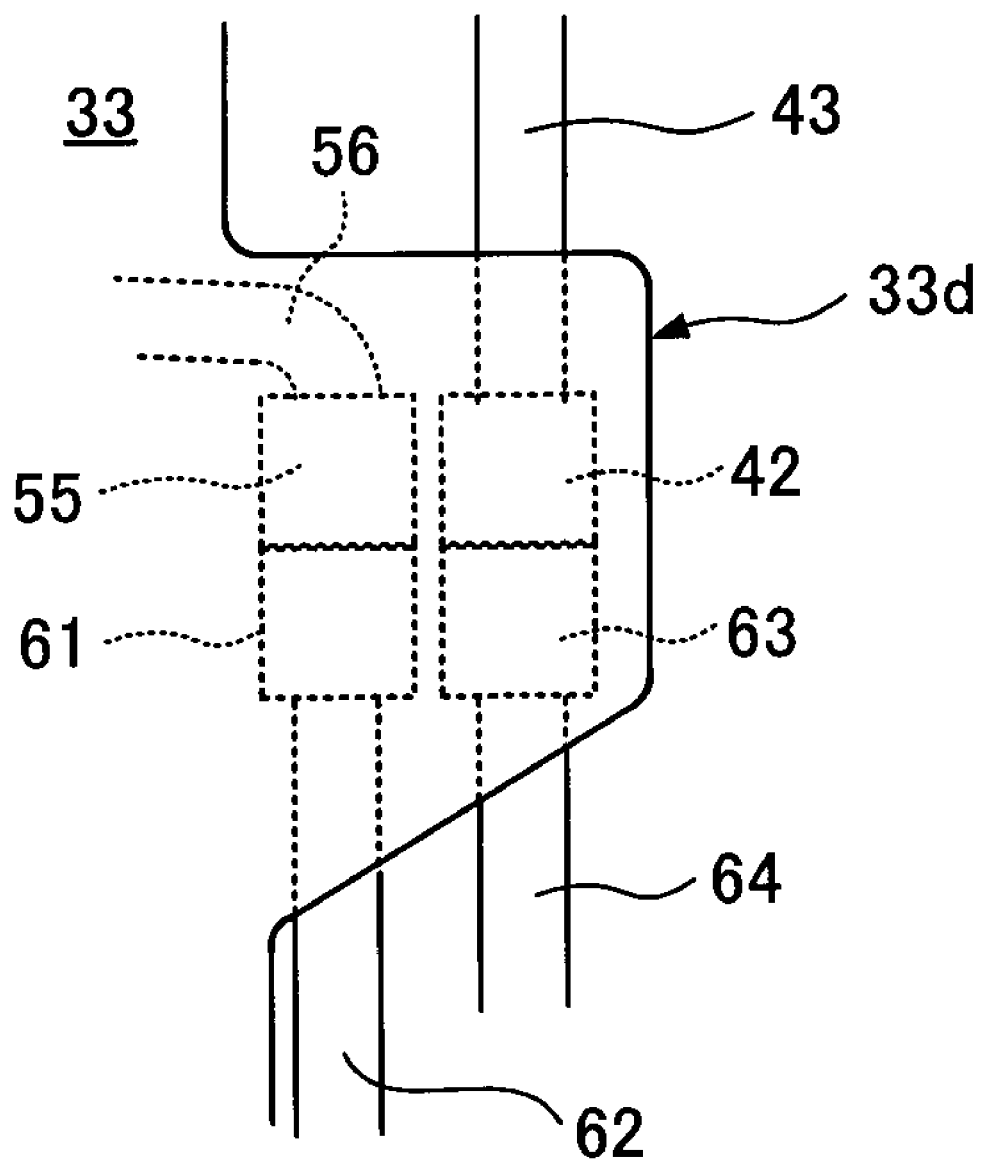
FIG. 5 A schematic diagram showing the positional relationship between a protrusion portion of an exhaust duct and connectors in Embodiment 1.

On the other hand, the exhaust duct 33 is provided with a protrusion portion 33d protruding toward the outside of the surface forming the moving path of the air. As shown in FIG. 5, a first connector 55 and a second connector 61 connected to the first connector 55 are located below the protrusion portion 33d. FIG. 5 is a schematic diagram showing part of the exhaust duct 33 viewed from above.

The first connector 55 is provided at one end of a wiring 56, and the other end of the wiring 56 is connected to equipment (for example, the controller 51) placed within the case 50. In other words, the first connector 55 is provided additionally for the battery pack 10. The second connector 61 is provided at one end of a wiring 62, and the other end of the wiring 62 is connected to an auxiliary battery (not shown) placed outside. Thus, power of the auxiliary battery (for example, 12 [V]) is supplied to the equipment within the case 50 through the wirings 62, 56.

As shown in FIG. 5, a third connector 42 and a fourth connector 63 connected to the third connector 42 are located below the protrusion portion 33d. The third connector 42 is provided at one end of a wiring 43, and the other end of the wiring 43 is connected to a motor (not shown) provided within the fan 40. The fourth connector 63 is provided at one end of a wiring 64, and the other end of the wiring 64 is connected to an auxiliary battery (not shown) placed outside. Thus, power of the auxiliary battery (for example, 12 [V]) is supplied to the motor within the fan 40 through the wirings 64, 43.

According to the present embodiment, when the exhaust duct 33 is viewed from a vertical direction as shown in FIG. 5, the four connectors 55, 42, 61, and 63 are located within the area of the protrusion portion 33d. Thus, even when a liquid falls from above the connectors 55, 42, 61, and 63, the liquid can be prevented from directly reaching the connectors 55, 42, 61, and 63. Specifically, in the present embodiment, the exhaust duct 33 has not only the function of forming the moving path of the air but also has the function of preventing a liquid from coming into contact with the connectors 55, 42, 61, and 63 through the provision of the protrusion portion 33d.

Figure 6:
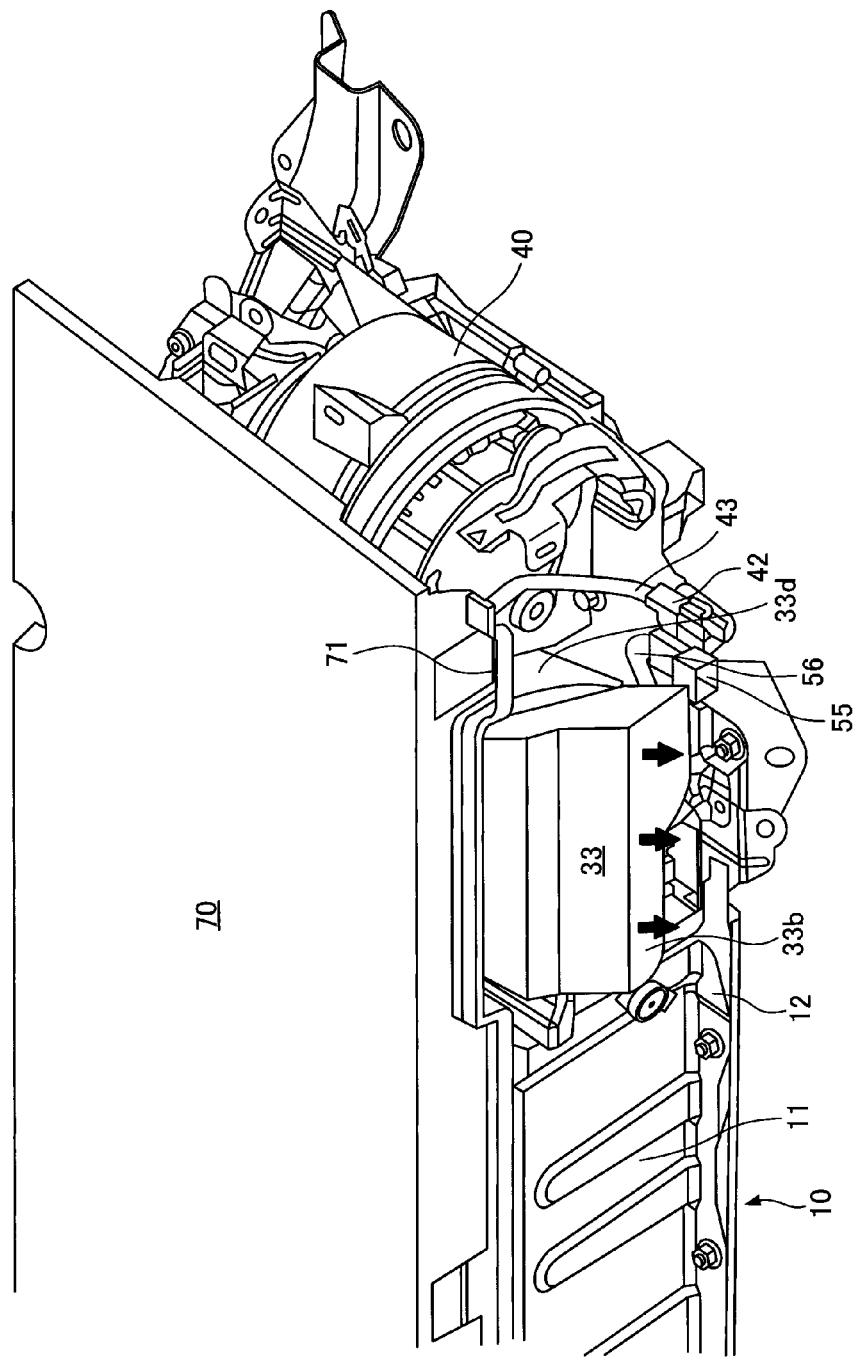
FIG. 6 A perspective view showing the outer appearance of a structure in which a deck board is placed above a battery pack and the exhaust duct in Embodiment 1.

As shown in FIG. 6, a deck board (panel) 70 is placed above the battery pack 10 and the exhaust duct 33 in the present embodiment. The deck board 70 covers an upper face of the battery pack 10 and is used for defining the space as the luggage room (luggage compartment) located above the battery pack 10. A depressed attachment portion 71 for fixing the deck board 70 is provided in an outer edge portion of the deck board 70. The connectors 55, 42, 61, and 63 are located below the attachment portion 71.

In such a configuration, when a liquid such as a drink is spilt on the deck board 70, the liquid may move to the outer edge portion of the deck board 70 and fall from the outer edge portion. When the depressed attachment portion 71 is provided in the outer edge portion of the deck board 70 as in the present embodiment, the liquid may tend to stay in the attachment portion 71 and fall from the attachment portion 71.

Thus, the protrusion portion 33d of the exhaust duct 33 is located between the outer edge portion of the deck bard 70 and the connectors 55, 42, 61, and 63 as in the present embodiment, so that the liquid can be prevented from reaching the connectors 55, 42, 61, and 63. Particularly, since the protrusion portion 33d is located between the attachment portion 71 and the connectors 55, 42, 61, and 63, it is possible to prevent effectively the liquid from reaching the connectors 55, 42, 61, and 63.

In the present embodiment, the protrusion portion 33d is inclined with respect to the horizontal plane. Thus, the liquid put on an upper face of the protrusion portion 33d is moved along the upper face of the protrusion portion 33d by its self-weight and then falls from the outer edge of the protrusion portion 33d. The inclination of the protrusion portion 33d can cause the liquid put on the protrusion portion 33d to be dropped toward a position off the connectors 55, 42, 61, and 63.

While all the connectors 55, 42, 61, and 63 are located within the area of the protrusion portion 33d as shown in FIG. 5 in the present embodiment, the present invention is not limited thereto. For example, only the connectors 55 and 61 (or the connectors 42 and 63) can be located within the area of the protrusion portion 33d, or the connection portion of the connectors 55 and 61 (or the connectors 42 and 63) can be located within the area of the protrusion portion 33d. In other words, it is essential only that the protrusion portion 33d should be used to prevent the liquid from reaching the connection portion of the two connectors. This can maintain the electrical connection in the connectors.

While the protrusion portion 33d is provided for the exhaust duct 33 placed above the case 50 in the present embodiment, the present invention is not limited thereto. Specifically, when the intake duct is placed above the case 50, a portion corresponding to the protrusion portion 33d can be provided for the intake duct.

While the first intake duct 31 and the exhaust duct 33 are connected to one side face of the battery pack 10 that is adjacent to the case 50 in the present embodiment, the present invention is not limited thereto. For example, the intake duct and the exhaust duct can be connected to two respective side faces of the battery pack 10 that face the respective end plates 13. In addition, one duct of the intake duct and the exhaust duct can be located above the case 50, and a protrusion portion (corresponding to the protrusion portion 33d) can be provided for that duct.

Figure 7:
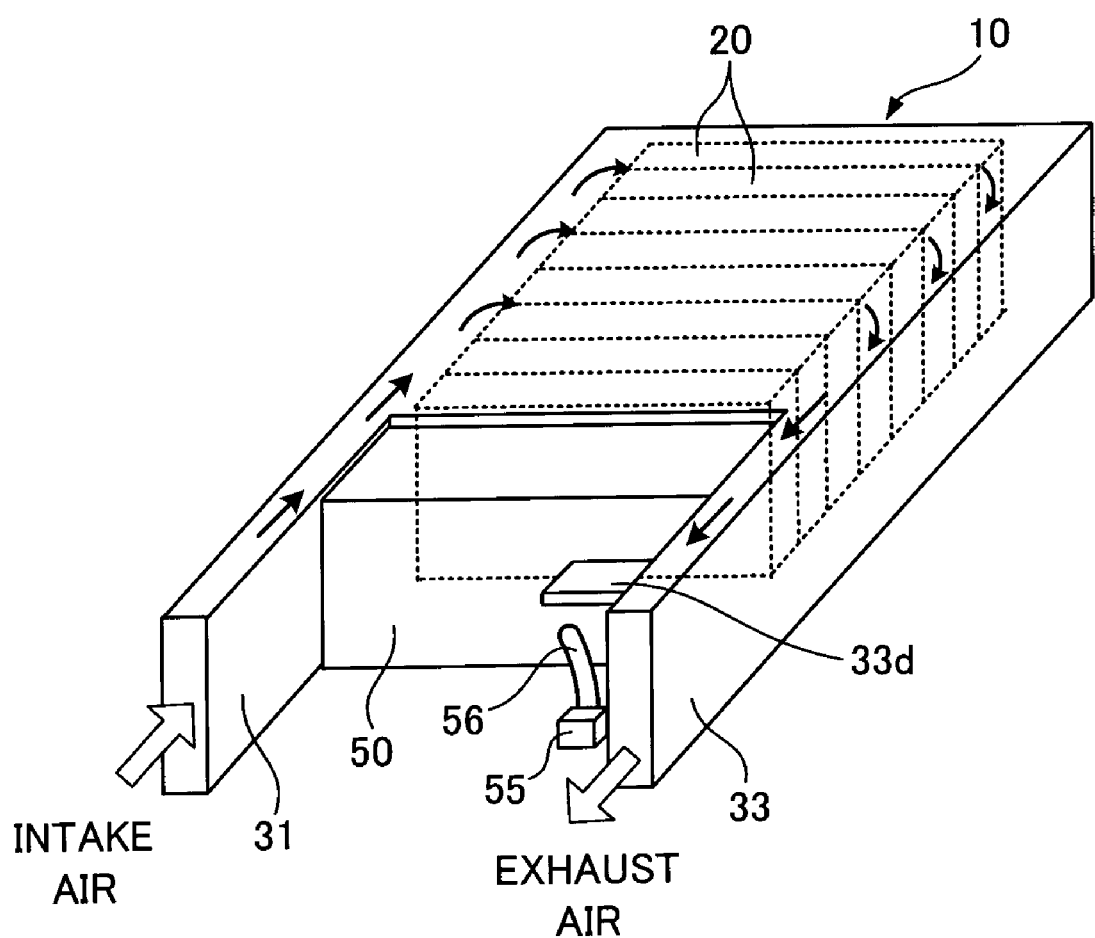
FIG. 7 A schematic diagram showing a temperature adjustment structure which is a modification of Embodiment 1.

While the present embodiment has the configuration in which the intake duct 31 and the exhaust duct 33 are placed below and above the case 50, respectively, the present invention is not limited thereto. For example, a configuration as shown in FIG. 7 can be used. FIG. 7 is a perspective view schematically showing a temperature adjustment structure which is a modification of the present embodiment. Members having the same functions as those of the members described in the present embodiment are designated with the same reference numerals.

While the air is moved from the bottom faces to the upper face of the battery modules 20 as shown in FIG. 1 in the present embodiment, air is moved from one side face to the other side face of battery modules 20 in the modification. In other words, while the intake duct and the exhaust duct are placed side by side in the vertical direction in the present embodiment, an intake duct 31 and an exhaust duct 33 are placed side by side in a horizontal direction in the modification. A case 50 is also placed between the intake duct 31 and the exhaust duct 33 in the modification.

A wiring 56 extends to the outside of the case 50, and a connector 55 is provided at the end of the wiring 56. A protrusion portion 33d is provided for the exhaust duct 33, and the protrusion portion 33d is located above the connector 55. The connector 55 is located within the area of the protrusion portion 33d when viewed from a vertical direction.

In the structure shown in FIG. 7, it is also possible to prevent a liquid falling toward the connector 55 by using the protrusion portion 33d. In the modification, the protrusion portion 33d can also be inclined with respect to the horizontal plane to drop the liquid put on the protrusion portion 33d toward a position different from that of the connector 55. While the protrusion portion 33d is provided for the exhaust duct 33 in the structure shown in FIG. 7, the protrusion portion can be provided for the intake duct 31 or the protrusion portion can be provided for the exhaust duct 33 and the intake duct 31.

The invention claimed is:

1. A temperature adjustment structure for adjusting a temperature of a power storage module included in a power storage apparatus mounted on a vehicle, comprising:
a duct forming a moving path of air in adjusting the temperature of the power storage module,
wherein the duct has a protrusion portion protruding toward the outside of the duct with respect to a surface forming the moving path, and
wherein the protrusion portion is located above a connector and at least a connection portion of the connector is located within an area of the protrusion portion when viewed from a vertical direction, the connector being provided additionally for the power storage apparatus and used for electrical connection to equipment placed parallel with the power storage module within the power storage apparatus.

2. The temperature adjustment structure according to claim 1, further comprising a panel configured to define space as a luggage compartment of the vehicle and located above the power storage apparatus,
wherein the panel has a depression portion in an outer edge portion thereof, the depression portion being located above the protrusion portion and being used for fixing the panel.

3. The temperature adjustment structure according to claim 1, wherein the protrusion portion is formed independently of a portion forming the moving path in the duct.

4. The temperature adjustment structure according to claim 2, wherein the protrusion portion is formed independently of a portion forming the moving path in the duct.

* * * * *